(12) United States Patent
Payri González et al.

(10) Patent No.: US 9,038,578 B2
(45) Date of Patent: May 26, 2015

(54) UNIT FOR SIMULATING THE PRESSURE AND TEMPERATURE CONDITIONS OF THE AIR DRAWN IN BY A RECIPROCATING INTERNAL COMBUSTION ENGINE

(75) Inventors: Francisco Payri González, Valencia (ES); José María Desantes Fernández, Valencia (ES); José Galindo Lucas, Valencia (ES); José Ramón Serrano Cruz, Valencia (ES)

(73) Assignee: UNIVERSIDAD POLITECNICA DE VALENCIA, Valencia (ES)

( * ) Notice: Subject to any disclaimer, the term of this patent is extended or adjusted under 35 U.S.C. 154(b) by 0 days.

(21) Appl. No.: 13/982,487

(22) PCT Filed: Jan. 10, 2012

(86) PCT No.: PCT/ES2012/070010
§ 371 (c)(1),
(2), (4) Date: Jul. 30, 2013

(87) PCT Pub. No.: WO2012/104454
PCT Pub. Date: Aug. 9, 2012

(65) Prior Publication Data
US 2013/0306159 A1 Nov. 21, 2013

(30) Foreign Application Priority Data
Jan. 31, 2011 (ES) .................................. 201130120

(51) Int. Cl.
*F02B 63/00* (2006.01)
*F02M 35/10* (2006.01)
*G01M 15/02* (2006.01)

(52) U.S. Cl.
CPC ......... *F02M 35/10242* (2013.01); *G01M 15/02* (2013.01)

(58) Field of Classification Search
CPC .............................. G01M 15/04; G01M 15/14
USPC ......... 123/2, 1 R; 73/114.01, 114.57, 116.02, 73/116.03, 118.01, 118.02
See application file for complete search history.

(56) References Cited

U.S. PATENT DOCUMENTS 2,882,615 A * 4/1959 Dawson, Jr. .................... 434/54
4,033,114 A * 7/1977 Zaugg ............................. 60/778
(Continued)

FOREIGN PATENT DOCUMENTS

CN 101738322 A 6/2010
CN 201600243 U 10/2010
(Continued)

OTHER PUBLICATIONS
International Search Report for PCT/ES/2012/070010 of Jun. 20, 2012.
(Continued)

*Primary Examiner* — Noah Kamen
*Assistant Examiner* — Long T Tran
(74) *Attorney, Agent, or Firm* — Graeser Associates International Inc; Dvorah Graeser (57) ABSTRACT

The invention relates to a unit for simulating the pressure and temperature conditions of an air flow drawn in by a reciprocating internal combustion engine (1) at a height above sea level, corresponding to the operating height of said reciprocating internal combustion engine (1). According to the invention, the unit comprises at least: (a) a radial inward-flow turbine (2) for expanding an air flow towards the pressure and temperature of the air drawn in by the reciprocating internal combustion engine; (b) a first container (4) and (c) a second container (5) connected to the first container (4) by means of at least a connection pipe (7) in order to balance the pressure between the two containers; (d) a centrifugal compressor (3); and (e) a vacuum pump (6) for maintaining a pressure equal to the pressure of the air flow drawn in by the reciprocating internal combustion engine (1). The invention also relates to the use of said unit for simulating the pressure and temperature conditions of the air drawn in by a reciprocating internal combustion engine.

23 Claims, 6 Drawing Sheets

(56) References Cited

U.S. PATENT DOCUMENTS

| | | | | |
|---|---|---|---|---|
| 4,624,109 | A | * | 11/1986 | Minovitch ................... 60/648 |
| 5,396,793 | A | * | 3/1995 | Colletti ..................... 73/116.03 |
| 7,181,379 | B2 | * | 2/2007 | Glinsky ............................ 703/8 |
| 7,606,307 | B2 | * | 10/2009 | Jeon ........................ 375/240.15 |
| 7,607,307 | B2 | * | 10/2009 | Bergholz ........................ 60/775 |
| 7,685,827 | B2 | * | 3/2010 | Reale et al. ..................... 60/775 |
| 2002/0114985 | A1 | * | 8/2002 | Shkolnik et al. ................. 429/20 |
| 2003/0014959 | A1 | * | 1/2003 | Ginter .......................... 60/39.26 |
| 2003/0182944 | A1 | * | 10/2003 | Hoffman et al. ............... 60/772 |
| 2004/0186699 | A1 | | 9/2004 | Glinsky |
| 2004/0216535 | A1 | * | 11/2004 | Brostmeyer et al. ......... 73/865.6 |
| 2005/0048345 | A1 | * | 3/2005 | Meacham ....................... 429/34 |
| 2010/0257924 | A1 | | 10/2010 | Stommel et al. |

FOREIGN PATENT DOCUMENTS

| | | |
|---|---|---|
| EP | 1600622 A2 | 11/2005 |
| EP | 2295950 A1 | 3/2011 |
| MX | PA03004561 A | 9/2003 |
| WO | 2008036993 A2 | 4/2008 |

OTHER PUBLICATIONS

IPRP for PCT/ES/2012/070010 of Aug. 6, 2013.

* cited by examiner

UNIT FOR SIMULATING THE PRESSURE AND TEMPERATURE CONDITIONS OF THE AIR DRAWN IN BY A RECIPROCATING INTERNAL COMBUSTION ENGINE

TECHNICAL FIELD

The present invention relates to a system and to a method for reproducing the pressure and temperature conditions of the air drawn in by a reciprocating internal combustion engine. More particularly, the invention relates to a system and a method which allows simulating the pressure and temperature conditions to which a reciprocating internal combustion engine is subjected according to the height above sea level at which it operates.

PRIOR ART

The need for establishing fixed pressure and temperature conditions in the atmosphere, according to altitude, which can be used for the development and tuning of engines or other airplane components, led the International Civil Aviation Organization (ICAO) to define the International Standard Atmosphere (ISA) in 1952.

When designing equipment intended for operating at a certain altitude above sea level, it is necessary to take into account variations occurring in the atmospheric pressure and temperature as the altitude increases with respect to the measuring point, which variations affect both air composition and density. Therefore, an object of this invention is to provide a low energy cost system suitable for application both in airplane engines and in engines of any other means of transport intended for operating at a height. More specifically, the object of the invention is a system capable of reproducing the pressure and temperature conditions of the air drawn in by a reciprocating engine according to its operating height above sea level.

Systems intended for testing engines taking into account the altitude above sea level can seek various objectives, among which the following stand out:
  repairing possible malfunctions in engine operation under specific conditions;
  optimizing fuel consumption, which is affected by the characteristics of the air drawn in by the engine;
  determining the ideal operation of air conditioning apparatuses installed in airplanes or similar means of transport;
  checking the operation of the gas circulation pipes.

In recent years, various studies intended for achieving the preceding objectives have been conducted. However, in most cases the provided solutions are based on theoretical modeling on the behavior of engines and on in situ testings conducted at a height. Furthermore, these modelings mostly aim to optimize engine fuel consumption.

For example, patent application US2004186699 describes a method and system for controlling the pressure and temperature of the air drawn in by an engine, as well as the exhaust gases thereof, balancing the pressure and temperature conditions. The testings are conducted both in simulated high altitude conditions (at pressures less than those of the measuring site) and in low altitude conditions, as well as under different temperature conditions. Therefore, the exhaust gases of the engine are sent to a dilution tunnel, and a sample of the diluted gases is subjected to analysis to determine the activity of the engine and the emission components thereof.

Unlike the preceding studies, the present invention relates to a system capable of reproducing at sea level the conditions of a reciprocating engine when it works at the altitude it reaches during operation.

Until now, there has been no invention in the prior art that comprises the same technical features as those defined by the system object of this invention.

DISCLOSURE OF THE INVENTION

The object of the invention is therefore a unit for simulating the pressure and temperature conditions of an airflow drawn in by a reciprocating internal combustion engine (1) at a height above sea level corresponding to the operating height of said reciprocating internal combustion engine (1), where said unit is characterized in that it comprises at least the following equipment:
  (a) a radial inward-flow turbine (2) for expanding an airflow from an initial state of pressure $p0$ and temperature $T0$ to a second state of pressure $p1$ and temperature $T1$, where $p0$ and $T0$ correspond to the pressure and temperature of the atmosphere A1 in which the reciprocating internal combustion engine (1) is located and where $p1$ and $T1$ correspond to the pressure and temperature of the airflow drawn in by the reciprocating internal combustion engine (1);
  (b) a first container (4) located after the radial inward-flow turbine (2) and at the inlet of the reciprocating internal combustion engine (1) for providing said airflow thereto at a pressure $p1$ and a temperature $T1$;
  (c) a second container (5) located at the outlet of the reciprocating internal combustion engine (1) and connected to the first container (4) through at least a connection pipe (7) in order to balance the pressure between both containers;
  (d) a centrifugal compressor (3) attached by its shaft to the radial inward-flow turbine (2), the assembly forming a system known as a turbine generator;
  (e) a vacuum pump (6) located after the second container (5) for maintaining a pressure equal to the pressure of the airflow drawn in by the reciprocating internal combustion engine (1). Said pump can preferably consist of a vane pump driven by an electric motor with or without a variable-frequency drive for being able to regulate the pressure $p2$ in the second container (5). Preferably, the capacity of said vacuum pump (6) will be enough to transfer exhaust gases of the reciprocating internal combustion engine (1) from the pressure $p2$ in the stagnation region of the second container 2 to the pressure of the atmosphere A1. Likewise in a preferred embodiment of the invention, said vacuum pump (6) can additionally comprise at least a suction valve for diluting exhaust gases, as well as at least a condensate extraction system.

In a preferred embodiment of the invention, the radial inward-flow turbine (2) consists of a variable-geometry turbine (VGT). Generally, variable-geometry turbines are made up of the same elements as a conventional turbine, but they include a ring of moving blades in the stator, such that they allow modifying the expansion ratio regardless of the transferred flow.

The first container (4) and the second container (5) preferably consist of cylindrical containers, preferably cylindrical steel containers, and more preferably cylindrical steel containers with a length such that each of them has at least a volume equal to twice the cubic capacity of the reciprocating internal combustion engine (1).

Specifically, the first container (4) allows the airflow to stabilize before entering the reciprocating internal combustion engine (1) and it is connected to said reciprocating internal combustion engine (1) through an intake duct designed for keeping pressure losses to a minimum, and preferably having a section substantially equal to that of the first container (4). The second container (5) likewise allows the exhaust gases of the reciprocating internal combustion engine (1) and is connected to same through an exhaust pipe, preferably having a section substantially equal to that of the second container (5).

In a preferred embodiment of the invention, the unit can also comprise before the vacuum pump (6) at least a particle filter (11), preferably at least a high-efficiency particle filter. By means of using said particle filter (11), it is possible to filter the particles out of the exhaust gases before they enter the vacuum pump (6), especially when the engine to be tested is a diesel engine. Additionally, if a particle filter (11) is used, the consumable components that are part of said particle filter (11) will be periodically replaced.

In an additional embodiment of the invention, the unit can comprise at least a heat exchanger (12), preferably an air-water heat exchanger. This heat exchanger (12) can use water from at least a cooling tower for cooling the exhaust gases to the temperature of the atmosphere A1. In a preferred embodiment in which the unit comprises a particle filter (11), the heat exchanger (12) will preferably be located before said particle filter (11). Preferably, the heat exchanger (12) can additionally comprise at least a condensate drain which can be open when use of the unit has ended.

The different pieces of equipment of the unit are characterized in that they are perfectly coupled, obtaining a versatile, reliable and energy-efficient unit.

Therefore, this unit allows reproducing, with a low energy cost, the pressure and temperature conditions of the air drawn in by a reciprocating internal combustion engine (1) at a specific height above sea level, as established by the ISA. These conditions correspond to temperature and pressure that are lower than those of the air at sea level (said pressure and said temperature being 1013.25 hPa and 15° C., respectively, according to ISA). By way of example, up to 11000 m (tropopause) the temperature drops at a rate of 6.5° C. every 1000 m, a temperature of −56.5° C. and a pressure of 225 hPa being reached at said height.

Another object of this invention is the use of a unit as described for simulating the operating conditions of a reciprocating internal combustion engine (1) operating at a height. This engine can preferably consist of an airplane engine, as well as an engine of any other means of transport operating at a height.

Therefore, an additional object of the invention is a method for simulating the pressure and temperature conditions of an airflow drawn in by a reciprocating internal combustion engine (1) at a height above sea level corresponding to the operating height of said reciprocating engine (1), where said method is characterized in that it comprises the following steps:

(a) expanding an airflow from an initial state of pressure $p_0$ and temperature $T_0$ to a second state of pressure $p_1$ and temperature $T_1$, where $p_0$ and $T_0$ correspond to the pressure and temperature of the atmosphere A1 in which the reciprocating internal combustion engine (1) is located and where $p_1$ and $T_1$ correspond to the pressure and temperature of the airflow drawn in by the reciprocating internal combustion engine (1);

(b) sending said airflow at a pressure $p_1$ and a temperature $T_1$ to at least a first container (4) from where the airflow is drawn in by the reciprocating internal combustion engine (1);

(c) discharging the exhaust gases of the reciprocating internal combustion engine (1) into at least a second container (5), from where a flow of said exhaust gases is suctioned by means of a vacuum pump (6) for maintaining a pressure $p_2$ equal to the pressure of the airflow drawn in by the reciprocating internal combustion engine (1);

The preceding method can be used both in dry air conditions and in conditions without dehumidifying.

Although the described steps correspond to the general steps of the method of the invention, said method can comprise additional steps according to the different embodiments of the unit object of the invention. Some examples of these embodiments are shown in the drawings attached to this description.

LIST OF REFERENCES

Reciprocating internal combustion engine (1)
Radial inward-flow turbine (2)
Centrifugal compressor (3)
First container (4)
Second container (5)
Vacuum pump (6)
Connection pipe (7)
Control valve (8)
Back pressure valve (9)
Temperature conditioning system (10)
Particle filter (11)
Heat exchanger (12)
Second heat exchanger (13)
Valve (14)
Third heat exchanger (15)
Flow diode or check valve (16)
Second radial inward-flow turbine (17)
Second centrifugal compressor (18)
Wastegate (19)
Chiller and/or dehumidifier (20)
3-way valve (21)
Second chiller and/or dehumidifier (22)

A series of particular embodiments of the invention are described below by way of non-limiting example in increasing order of cost and complexity according to the drawings attached to this description.

DETAILED DISCLOSURE OF THE INVENTION

Particular Embodiment 1

Figure 1:
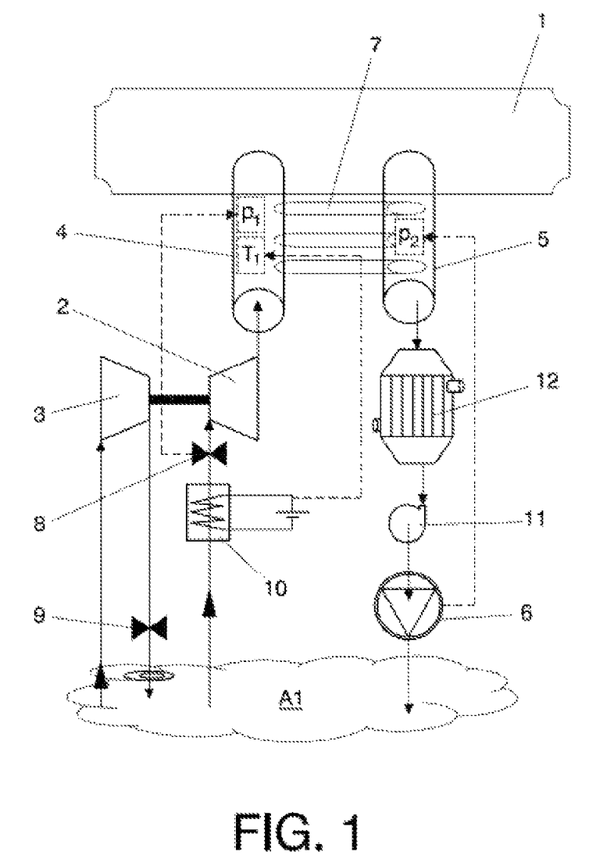
FIG. 1 shows a particular embodiment of the unit object of the invention.

In a particular embodiment 1 of the invention, as shown in FIG. 1, the unit comprises:

(a) a variable-geometry radial inward-flow turbine (2) comprising a control or flow regulation valve (8), which can be the actual stator of the radial inward-flow turbine (2). An airflow is expanded in said radial inward-flow turbine (2) from an initial state of pressure p0 and temperature T0 to a second state of pressure p1 and temperature T1, where p0 and T0 correspond to the pressure and temperature of the environment A1 in which the reciprocating internal combustion engine (1) is located and where p1 and T1 correspond to the pressure and temperature of the airflow drawn in by the reciprocating engine (1);

(b) a first container (4) located after the radial inward-flow turbine (2) and at the inlet of the reciprocating internal combustion engine (1) for providing said airflow thereto at a pressure p1 and a temperature T1. Said first container (4) is connected to the reciprocating internal combustion engine (1) through an intake duct having a section substantially equal to that of the first container (4);

(c) a second container (5) located at the outlet of the reciprocating internal combustion engine (1) and connected thereto through an exhaust pipe, preferably having a section substantially equal to that of the second container (5). Both the first container (4) and the second container (5) are connected through a connection pipe (7) in order to balance the pressure between both containers. Furthermore, both the first container (4) and the second container (5) have a volume equal to twice the cubic capacity of the reciprocating internal combustion engine (1);

(d) a centrifugal compressor (3) coupled to the radial inward-flow turbine (2) such that the useful range of the centrifugal compressor (3) (between choke conditions and surge conditions) coincides with the maximum performance range of the radial inward-flow turbine (2). It is possible to regulate the expansion ratio of the turbine and, therefore, to control the pressure p1 in the first container (4) through the control valve (8) of the radial inward-flow turbine (2);

(e) a vacuum pump (6) for maintaining a pressure equal to the pressure of the airflow drawn in by the reciprocating internal combustion engine (1).

The unit also comprises a back pressure valve (9) through which the centrifugal compressor (3) discharges the airflow drawn in from the atmosphere A1 back into the same atmosphere A1. The back pressure valve (9) is regulated in a fixed position such that the mean performance of the radial inward-flow turbine (2) is maximum at any engine speed.

The unit additionally comprises a temperature conditioning system (10) which can change the temperature of A1 around ±10° C. If heating is necessary, said temperature conditioning system (10) can consist of an electric resistance. If, in contrast, cooling is necessary, the temperature conditioning system (10) can consist of conventional cooling equipment with a reverse-Rankine cycle. The temperature conditioning system (10) is used as a fine regulator of the temperature T1 in the first container (4), accurately adjusting the desired air temperature after expansion in the radial inward-flow turbine (2).

In this particular embodiment of the invention, the unit further comprises a high efficiency particle filter (11) before the vacuum pump (6), as well as an air-water heat exchanger (12).

Another object of this invention is a method performed by the unit of embodiment 1. Therefore, once the reciprocating internal combustion engine (1) reaches its operating point, the air of the atmosphere A1 is expanded in the radial inward-flow turbine (2) until the pressure p1 is the desired pressure according to the flight altitude to be simulated. Achieving suitable expansion is assured by a suitable selection of the radial inward-flow turbine (2), considering the flow and density of the air drawn in by the reciprocating internal combustion engine (1). Furthermore, since the radial inward-flow turbine (2) is a variable-geometry turbine, the unit comprises a control or flow regulation valve (8) (generally, the actual stator of the radial inward-flow turbine (2)). This control valve (8) allows assuring the fine adjustment of p1 in the first container (4), as well as the precise control of p1 using a standard PID controller acting on the control valve (8).

The radial inward-flow turbine (2) extracts energy from of the flow during flow expansion and that energy is consumed by the centrifugal compressor (3) for compressing the air and subsequently dissipating it into the atmosphere A1 where the centrifugal compressor (3) discharges the compressed air. The back pressure valve (9) is adjusted in a constant opening such that the centrifugal compressor (3) always works under stable operating conditions and at maximum performance operating points of the radial inward-flow turbine (2). Therefore, the back pressure valve (9) will be responsible for marking the resistive load curve against which the centrifugal compressor (3) will work.

As a result of the expansion and the loss of energy of the fluid in the radial inward-flow turbine (2) to pressure p1, the temperature in the first container (4) will drop to a temperature close to T1. Adjusting the temperature upstream of the radial inward-flow turbine (2) with the temperature conditioning system (10) in a range of ±10° C. will allow reaching the desired value of temperature T1. Precise control of the radial inward-flow turbine (2) will be done with a standard PID acting on the temperature conditioning system (10).

The vane vacuum pump (6) assures the desired drop in pressure (p2) in the second container (5). For example, the variable-frequency drive of the electric motor driving the vacuum pump (6) assures control of p2. A standard PID acting on the variable-frequency drive regulates the fine adjustment of p2. The exhaust gases suctioned by the vacuum pump (6) are previously cooled in the heat exchanger (12) and the particles of these gases are retained in the particle filter (11) in order to assure low electrical consumption and greater reliability of the vacuum pump (6). The vacuum pump (6) can consist of commercial equipment.

On the other hand, the connection pipe or pipes (7) act like pressure balancing ports, assuring equal pressure in the first container (4) (p1) and in the second container (5) (p2). Therefore, they allow simulating equal ISA flight conditions both in the intake and in the exhaust, and they facilitate controlling pressure p1 and p2. If the vacuum pump (6) suctions more flow that what is transferred by the reciprocating internal combustion engine (1), the vacuum pump (6) could work without a variable-frequency drive, since the excess flow would pass through the connection pipe or pipes (7) and the pressure p2 would still be equal to p1.

Particular Embodiment 2

Figure 2:
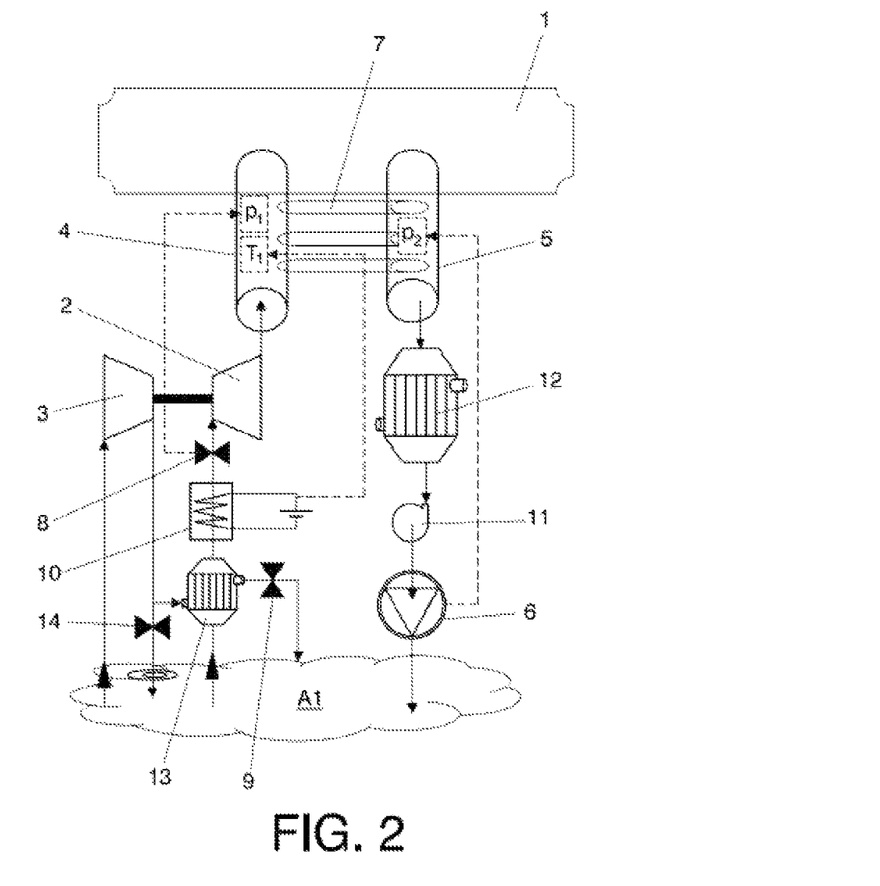
FIG. 2 shows a unit according to FIG. 1, characterized in that it additionally comprises heat recovery equipment.

According to FIG. 2, this second embodiment is characterized in that it additionally comprises the equipment of the unit depicted in FIG. 1, a second air-air heat exchanger (13) for heating the airflow at the inlet of the radial inward-flow turbine (2) with the airflow at the outlet of the centrifugal compressor (3) and reducing the need for electric power if heating with a temperature conditioning system (10) consisting of a resistance is needed.

This particular embodiment of the invention can also comprise a valve (14) for bypassing the second air-air heat exchanger (13) and preventing heating the airflow at the inlet of the radial inward-flow turbine (2) if cooling with the temperature conditioning system (10) is needed. In any case, the temperature conditioning system (10) will be responsible for performing the fine adjustment of the temperature T1.

Another object of this invention is a method carried out by the unit of embodiment 2. In addition to what is described for the operation of embodiment 1, this unit of embodiment 2 operates as follows:

When the air upstream of the radial inward-flow turbine (2) must be heated to achieve the target temperature T1, the hot air exiting the centrifugal compressor (3) could be used. To that end, heat of the air provided by the centrifugal compressor (3) will be transmitted to the air drawn in by the radial inward-flow turbine (2) in the second heat exchanger (13). In this operating mode, the valve (14) is closed and the back pressure valve (9) is open in their reference conditions defined a priori (like in embodiment 1, these conditions are those in which the centrifugal compressor (3) works close to the maximum performance of the radial inward-flow turbine (2) in the established operating conditions).

When the air upstream of the radial inward-flow turbine (2) must be cooled to achieve the target temperature T1, the second air-air heat exchanger (13) will not be used. To that end, the back pressure valve (9) will close and the valve (14) will open until reaching the same conditions that the back pressure valve (9) had in the operating mode of unit 1.

Particular Embodiment 3

Figure 3:
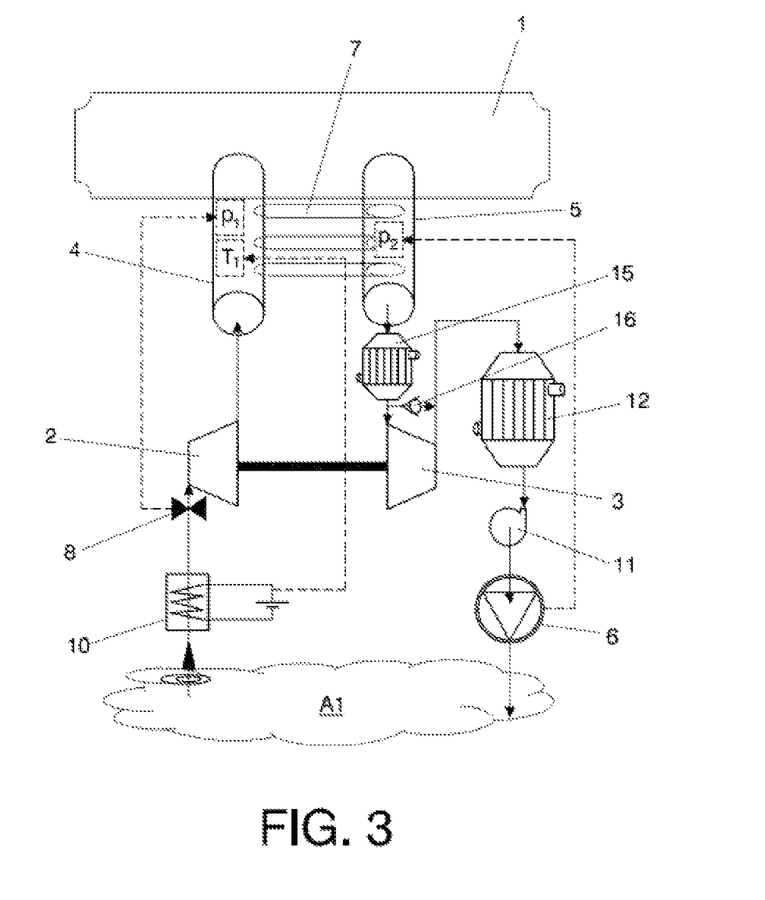
FIG. 3 shows an additional particular embodiment of the unit, characterized in that it additionally comprises a rise in pressure before the vacuum pump (6).

As shown in FIG. 3, in this particular embodiment the unit can comprise the centrifugal compressor (3) located after the second container (5). This centrifugal compressor (3) draws in the exhaust gases coming from the second container (5) and increases the pressure of the gases at the inlet of the vacuum pump (6), with the subsequent energy savings for said vacuum pump (6). Nevertheless, the pressure p2 can still be regulated by means of the variable-frequency drive of the electric motor of the vacuum pump (6).

As a result of the foregoing, this particular embodiment of the invention does not comprise the back pressure valve (9) as it is obsolete.

The unit also comprises a third air-water heat exchanger (15) cooling the exhaust gases to the temperature of the atmosphere A1 at the inlet of the centrifugal compressor (3).

The unit additionally comprises a flow diode or check valve (16), which in this particular embodiment 3 serves as a bypass of the centrifugal compressor (3). This flow diode or check valve (16) can open if the pressure upstream of the centrifugal compressor (3) is greater than the pressure downstream of the centrifugal compressor (3).

Another object of this invention is a method carried out by the unit of embodiment 3. In addition to what is described in embodiment 1, this unit operates as follows:

Firstly, the compressor absorbing the energy extracted from the air by the radial inward-flow turbine (2) does not dissipate this energy by transferring air of the atmosphere A1. In this embodiment, the centrifugal compressor (3) transfers combustion gases from the second container (5) to the inlet of the vacuum pump (6). It therefore helps the vacuum pump (6) work and reduces the electrical consumption thereof.

The third air-water heat exchanger (15) cools the combustion gases suctioned from the second container (5) before entering the centrifugal compressor (3) for increasing the density of the flow at the inlet of the compressor, improving its efficiency and reducing the surge risk of the compressor.

The vacuum pump (6) continues regulating pressure p2 in the second container (5) with a standard PID. The heat exchanger (12) cools the exhaust gases at the outlet of the centrifugal compressor (3) before they enter the vacuum pump (6).

The operating conditions of the centrifugal compressor (3) will be established in the unit of embodiment 3 by the flow transferred by the vacuum pump (6) and by the engine speed of the turbine generator. The engine speed of the turbine generator is a consequence of the energy balance between the radial inward-flow turbine (2) and the centrifugal compressor (3). As a result, sometimes there may not be enough engine speed and the pressure downstream of the centrifugal compressor (3) may be equal to or less than that of the second container (5). In this case, the flow diode or check valve (16) will open and will act as a bypass for part of the flow of the exhaust gases until the output pressure of the compressor is equal to the target pressure p2. Since the flow diode or check valve (16) only opens when the pressure downstream of the centrifugal compressor (3) is less than the pressure upstream, this valve is a diode or "check valve" that only allows the flow to pass through in one direction.

Particular Embodiment 4

Figure 4:
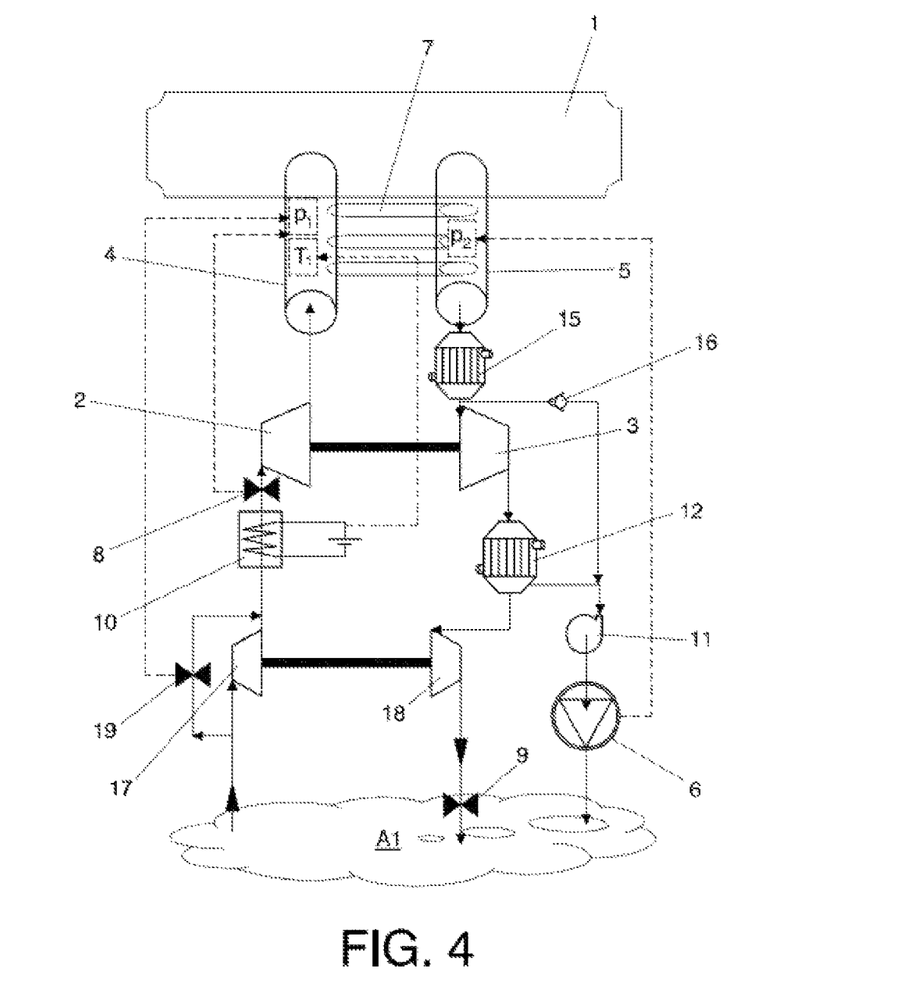
FIG. 4 shows an additional particular embodiment of the unit, characterized in that it comprises a two-step expansion and compression in two turbo compressors and a vacuum pump (6) as support equipment for maintaining the drop in pressure at the discharge of the reciprocating internal combustion engine (1).

The unit object of the present invention in embodiment 4 is depicted in FIG. 4. This embodiment 4 comprises in addition or alternatively to the equipment of the unit of embodiment 3, the following equipment:

One or several turbine generators (a turbine generator being understood as an assembly of a radial inward-flow turbine and a centrifugal compressor) operating in series with the turbine generator of the unit of embodiment 3, which was made up of the variable-geometry radial inward-flow turbine (2) and the centrifugal compressor (3).

In embodiment 4, the second radial inward-flow turbine (17) does not need to be a variable-geometry turbine; it could be a fixed-geometry turbine, such as the case depicted in FIG. 4. FIG. 4 depicts only an additional turbine generator in series with that of embodiment 3. The new turbine generator is made up of the second radial inward-flow turbine (17) and the second centrifugal compressor (18). Said second radial inward-flow turbine (17) and said second centrifugal compressor (18) preferably have a size smaller than that of the radial inward-flow turbine (2) and that of the centrifugal compressor (3) because the flow in the second radial inward-flow turbine (17) and in the second centrifugal compressor (18) is denser than in the respective first radial inward-flow turbine and centrifugal compressor.

The size of the second radial inward-flow turbine (17) and of the second centrifugal compressor (18) is selected such that, on one hand, the total pressure surge between the atmosphere A1 and the first container (4) is sub-divided into preferably equal parts between the second radial inward-flow turbine (17) and the radial inward-flow turbine (2); and on the other hand, the total pressure surge between the atmosphere A1 and the second container (5) is sub-divided into preferably equal parts between the second centrifugal compressor (18) and the centrifugal compressor (3). The radial inward-flow turbine (2), the second radial inward-flow turbine (17), the centrifugal compressor (3) and the second centrifugal compressor (18) can therefore work with pressure surges and engine speeds that are within their maximum performance operative areas. Therefore, even though the unit may be more expensive, it is possible to maximize the performance thereof as a result of minimizing the energy consumption of the vacuum pump (6), which makes up the primary consumption of the unit.

The second radial inward-flow turbine (17) can additionally be provided with a wastegate (18), which acts as a bypass of said second radial inward-flow turbine (17). This wastegate (19), together with the variable-geometry mechanism of the first radial inward-flow turbine or control valve (8), can be responsible for regulating the pressure p1 in the first container (4) based on the flow bypass in the second radial inward-flow turbine (17), and therefore for regulating the expansion of the flow downstream of the second radial inward-flow turbine (17).

The air-water heat exchanger (12) can be located in a position downstream of the centrifugal compressor (3) but upstream of the second centrifugal compressor (18) and of the particle filter (11), respectively. The vacuum pump (6) and the centrifugal compressor (3) therefore work in parallel and the heat exchanger (12) cools the exhaust gases suctioned by both pieces of equipment.

The unit additionally comprises a back pressure valve (9) having the same characteristics and function as that described in embodiment 1.

Another object of this invention is a method carried out by the unit of embodiment 4. This unit has the highest installation cost and lowest operating energy consumption since the compressors aid the vacuum pump (6) in a greater range of pressures as a result the total pressure surges being subdivided between several pieces of equipment. In addition to what is described for the operation of the unit of embodiment 3, this unit operates as follows:

As shown in FIG. 4, only one additional turbine generator has been depicted in series with that of embodiment 3. The new turbine generator is made up of the second inward-flow turbine (17) and the second centrifugal compressor (18). Maximum expansion is achieved when the wastegate (19) is completely closed and the control valve (8) is in its most tightly closed position possible (which is never completely closed in a variable-geometry turbine).

After this point, the expansion ratio is first reduced by opening the control valve (8) to its maximum opening and then by opening the back pressure valve (9) to its maximum opening. Control will therefore be performed with 2 standard PIDs operating sequentially for regulating the pressure p1 in the first container (4). When the expansion is reduced between A1 and the first container (4), first the PID acting on the control valve (8) will operate, closing it until reaching its actuation limit, and then the PID acting on the wastegate (19) will operate. When expansion increases between A1 and the first container (4), the reverse will take place, first the PID acting on the wastegate (19) will operate, closing it until reaching its actuation limit, and then the PID acting on the control valve (8) will operate.

The centrifugal compressor (3) operates in the same way as in embodiment 3, its operation being limited by the flow diode or check valve (16). The operation of the centrifugal compressor (3) will be regulated by the position of the back pressure valve (9) which will assure operation in the good performance areas of the second inward-flow turbine (17) as in the unit of embodiment 1.

The vane vacuum pump (6) will operate in parallel with the second centrifugal compressor (18) and the flow that the second centrifugal compressor (18) is not capable of transferring will be transferred by the vacuum pump (6). The heat exchanger (12) will serve for cooling the exhaust gases transferred by both machines, i.e., the vacuum pump (6) and the second centrifugal compressor (18).

Particular Embodiment 5

Figure 5:
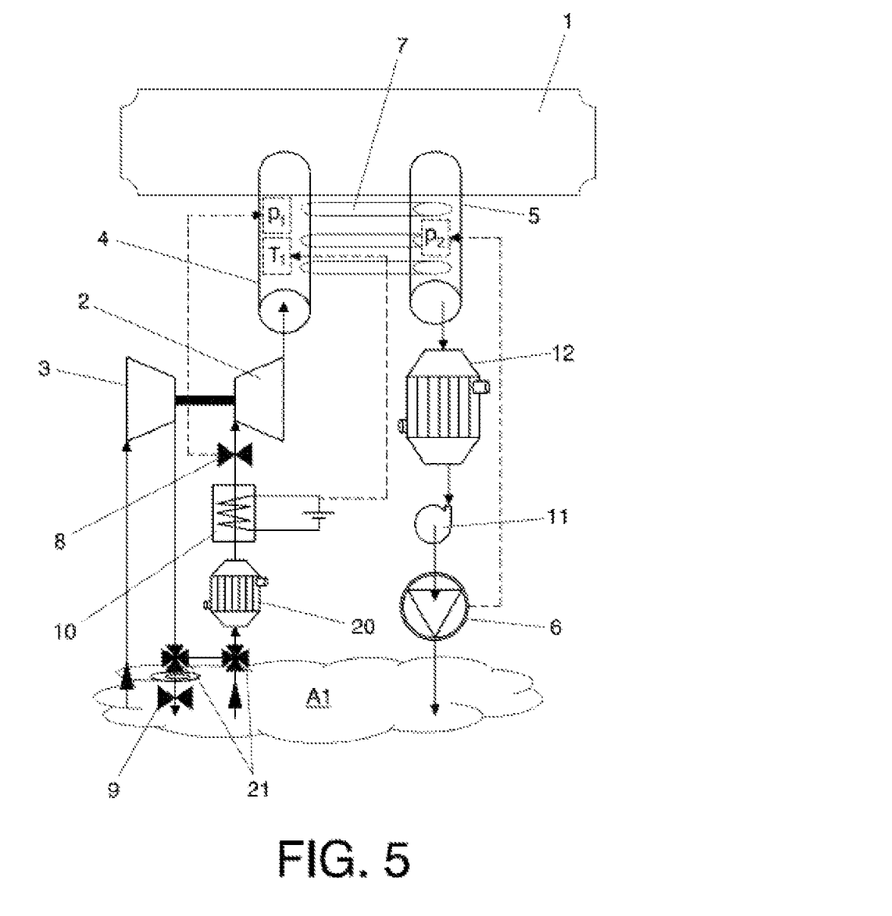
FIG. 5 shows an additional particular embodiment of the unit, characterized in that it comprises a step of making use of the pressure in the centrifugal compressor (3) for cooling and/or drying air in the first container (4).

The unit object of the present invention in embodiment 5 is depicted in FIG. 5. In addition to what has been disclosed in embodiment 1, it comprises a system of communication between the discharge of the centrifugal compressor (3) and the inlet of the radial inward-flow turbine (2) through the following equipment and modifications:

A chiller and/or dehumidifier (20) for cooling the airflow coming from the centrifugal compressor (3) before entering the radial inward-flow turbine (2); and Two three-way valves (21) which are responsible for disconnecting the discharge of the centrifugal compressor (3) from the draw of the radial inward-flow turbine (2), as well as for sending both intakes to the atmosphere A1 when said disconnection is performed. When connection between the centrifugal compressor (3) and the radial inward-flow turbine (2) is desired, the operation of the three-way valves (21) will be the reverse.

Another object of this invention is a method carried out by the unit of embodiment 5.

According to this embodiment, to reduce the need for cooling or condensing the humidity upstream of the radial inward-flow turbine (2), the air compressed by the centrifugal compressor (3) is sent to the radial inward-flow turbine (2) through a chiller and/or dehumidifier (20).

When the compression ratio of the centrifugal compressor (3) or its operating point is not suitable for complying with the operation task of the unit of this embodiment 5 or for assuring the stable operation of the centrifugal compressor (3), the three-way valves (21) will then open to allow discharging the air of the centrifugal compressor (3) into the atmosphere A1 and drawing in the air of the radial inward-flow turbine (2) from the atmosphere A1, and in turn (since they are 3-way valves) closing communication between the centrifugal compressor (3) and the radial inward-flow turbine (2).

Particular Embodiment 6

Figure 6:
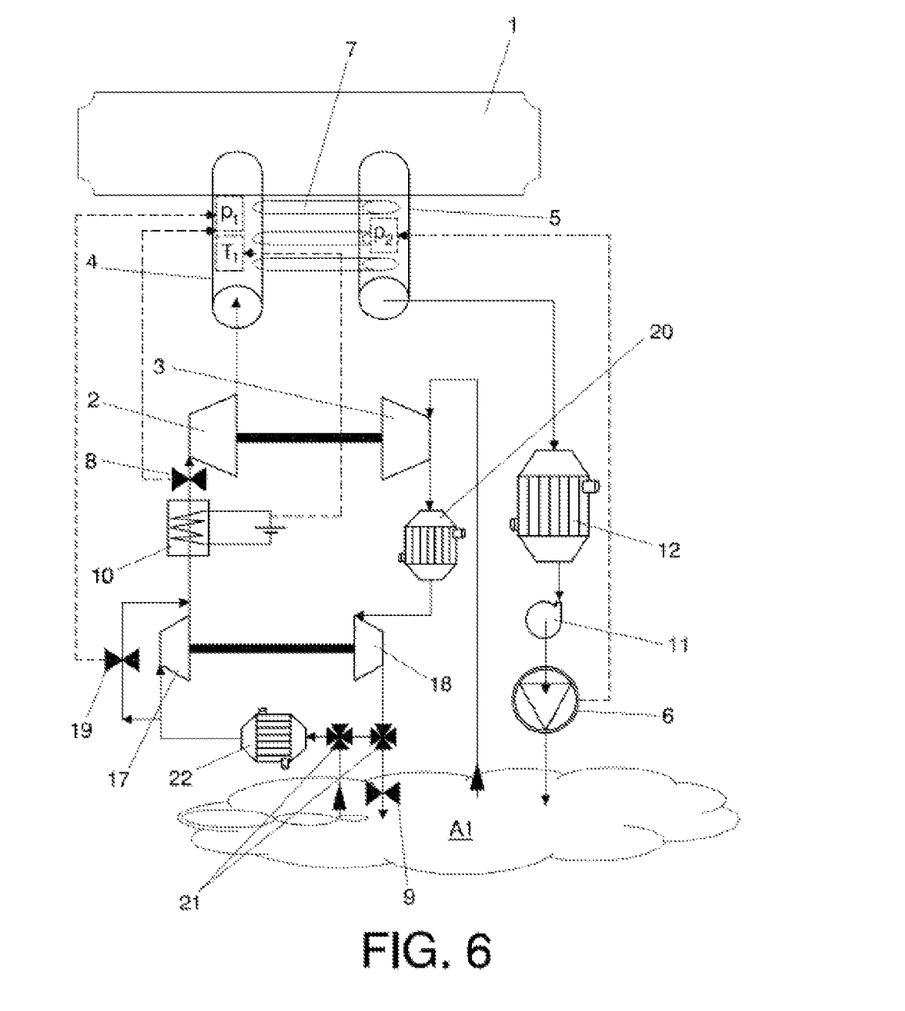
FIG. 6 shows an additional particular embodiment of the unit, characterized in that it comprises making use of the pressure in a centrifugal compressor (3) and in a second centrifugal compressor (18) for cooling and/or drying air in the first container (4) and in the second container (5). That is possible as a result of the two-step expansion in turbines. The vacuum pump (6) will be necessary for maintaining the drop in pressure at the discharge of the reciprocating internal combustion engine (1).

The unit object of the present invention in embodiment 6 is depicted in FIG. 6. In addition to what has been disclosed in embodiment 5, this unit consists of compression and expansion in two or more steps in the turbo machines (in FIG. 6 only two steps have been depicted for the sake of simplicity) as a result of the following equipment and modifications:

A second chiller or dehumidifier (22) for cooling the air coming from the second centrifugal compressor (18) before entering the second radial inward-flow turbine (17).

Said unit also comprises two three-way valves (21) which are responsible for disconnecting the discharge of the second centrifugal compressor (18) from the draw of the second radial inward-flow turbine (17), as well as for sending both intakes to the atmosphere A1 when said disconnection is performed. When connection between the second centrifugal compressor (18) and the second radial inward-flow turbine (17) is desired, the operation of the three-way valves (20) will be the reverse.

Another object of this invention is a method carried out by the unit of embodiment 6.

In addition to that which has been described for the operation of embodiment 5, the unit of this embodiment 6 operates by compressing and expanding in the turbines and compressors in two or more steps (only two steps have been depicted in FIG. 6) as follows:

To reduce the need for cooling or condensing the humidity upstream of the radial inward-flow turbine (2) and of the second radial inward-flow turbine (17), the air is expanded in two steps in these turbines, after having been previously compressed in two steps in the centrifugal compressor (3) and in the second centrifugal compressor (18), and cooled in the chillers/dehumidifiers (20) and (22) between the compression steps.

When the compression ratio of the centrifugal compressor (3) and of the second centrifugal compressor (18) or the operating point thereof are not suitable for complying with the operation task of the unit of this embodiment 6 or for assuring the stable operation of the centrifugal compressor (3) and of the second centrifugal compressor (18), the three-way valves (21) will then open to allow discharging the air of the second centrifugal compressor (18) into the atmosphere A1 and drawing in the air of the second radial inward-flow turbine (17) from the atmosphere A1, and in turn (since they are 3-way valves) closing communication between the second centrifugal compressor (18) and the second radial inward-flow turbine (17).

Only one additional turbine generator has been depicted in FIG. 6 in series with that of embodiment 5. The new turbine generator is made up of the second radial inward-flow turbine (17) and the second centrifugal compressor (18). Maximum expansion is achieved when the wastegate (19) is completely closed and the control valve (8) is in its most tightly closed position possible (which is never completely closed in a variable-geometry turbine). After this point, the expansion ratio is reduced first by opening the control valve (8) to its maximum opening and then by opening the wastegate (19) to its maximum opening. Control will therefore be performed with 2 standard PIDs operating sequentially for regulating the pressure p1 in the first container (4). When the expansion is reduced between the atmosphere A1 and the first container (4), first PID acting on the control valve (8) will operate, closing it until reaching its actuation limit, and then the PID acting on the wastegate (19) will operate. When expansion increases between the atmosphere A1 and the first container (4), the reverse will take place, first the PID acting on the wastegate (19) will operate, and then the PID acting on the control valve (8) will operate.

The invention claimed is:

1. A unit for simulating the pressure and temperature conditions of an airflow drawn in by a reciprocating internal combustion engine at a height above sea level corresponding to the operating height of said reciprocating internal combustion engine, where said unit comprises at least the following equipment:
    (a) a radial inward-flow turbine for expanding an airflow from an initial state of pressure p0 and temperature T0 to a second state of pressure p1 and temperature T1, where p0 and T0 correspond to the pressure and temperature of the atmosphere A1 in which the reciprocating internal combustion engine is located and where p1 and T1 correspond to the pressure and temperature of the airflow drawn in by the reciprocating internal combustion engine;
    (b) a first container located after the radial inward-flow turbine and at the inlet of the reciprocating internal combustion engine for providing said airflow thereto at a pressure p1 and a temperature T1;
    (c) a second container located at the outlet of the reciprocating internal combustion engine and connected to the first container through at least a connection pipe in order to balance the pressure between both containers;
    (d) a centrifugal compressor attached by its shaft to the radial inward-flow turbine, the assembly forming a system known as a turbine generator;
    (e) a vacuum pump located after the second container for maintaining a pressure equal to the pressure of the airflow drawn in by the reciprocating internal combustion engine.

2. The unit according to claim 1, where the first container is connected to the reciprocating internal combustion engine through an intake duct having a section equal to that of the first container and where the second container is connected to the reciprocating internal combustion engine through an exhaust pipe having a section equal to that of the second container.

3. The unit according to claim 1, further comprising:
    (a) at least a particle filter before the vacuum pump
    (b) at least a heat exchanger located before the vacuum pump, said heat exchanger preferably consisting of an air-water heat exchanger additionally comprising at least a condensate drainage system,
    (c) at least a control valve for controlling the pressure p1 in the first container,
    (d) at least a back pressure valve located after the centrifugal compressor,
    (e) at least a temperature conditioning system located before the radial inward-flow turbine, where said temperature conditioning system is capable of changing the temperature of the atmosphere A1 around ±10° C.

4. The unit according to claim 3, further comprising at least a second heat exchanger located before the radial inward-flow turbine and being connected to the centrifugal compressor for heating the airflow at the inlet of the radial inward-flow turbine with the airflow at the outlet of the centrifugal compressor.

5. The unit according to claim 4, further comprising at least a valve for bypassing the second heat exchanger.

6. The unit according to claim 3, wherein the centrifugal compressor is located at the outlet of the second container before the inlet of the vacuum pump.

7. The unit according to claim 6, further comprising
    (a) a third heat exchanger cooling the exhaust gases of the reciprocating internal combustion engine to the temperature of the atmosphere A1 before they enter the centrifugal compressor,
    (b) a flow diode or check valve located before the centrifugal compressor.

8. The unit according to claim 7, further comprising at least a second radial inward-flow turbine and at least a second centrifugal compressor operating in series with the radial inward-flow turbine and the centrifugal compressor.

9. The unit according to claim 8, where said second radial inward-flow turbine and said second centrifugal compressor have a size smaller than that of the radial inward-flow turbine and that of the centrifugal compressor.

10. The unit according to claim 8, where the second radial inward-flow turbine further comprises at least a wastegate.

11. The unit according to claim 10, further comprising at least a heat exchanger located in a position downstream of the centrifugal compressor, but upstream of the second centrifugal compressor and of the particle filter.

12. The unit according to claim 3, further comprising at least a chiller and/or dehumidifier for cooling the airflow coming from the centrifugal compressor before entering the radial inward-flow turbine.

13. The unit according to claim 12, further comprising two three-way valves which are responsible for disconnecting the discharge of the centrifugal compressor from the draw of the radial inward-flow turbine.

14. The unit according to claim 13, further comprising at least a second chiller or dehumidifier for cooling the air coming from the second centrifugal compressor before entering the second radial inward-flow turbine.

15. Use of a unit according to claim 14 for simulating the pressure and temperature conditions of an airflow drawn in by a reciprocating internal combustion engine at a height above sea level corresponding to the operating height of said reciprocating internal combustion engine.

16. A method for simulating the pressure and temperature conditions of an airflow drawn in by a reciprocating internal combustion engine at a height above sea level corresponding to the operating height of said reciprocating engine, where said method is characterized in that it comprises the following steps:
   (a) expanding an airflow from an initial state of pressure $p0$ and temperature $T0$ to a second state of pressure $p1$ and temperature $T1$ in a radial inward-flow turbine connected to a centrifugal compressor forming an assembly known as a turbine generator, where $p0$ and $T0$ correspond to the pressure and temperature of the atmosphere $A1$ in which the reciprocating internal combustion engine is located and where $p1$ and $T1$ correspond to the pressure and temperature of the airflow drawn in by the reciprocating internal combustion engine;
   (b) sending said airflow at a pressure $p1$ and a temperature $T1$ to at least a first container from where the airflow is drawn in by the reciprocating internal combustion engine;
   (c) discharging the exhaust gases of the reciprocating internal combustion engine into at least a second container, from where a flow of said exhaust gases is suctioned by means of a vacuum pump for maintaining a pressure $p2$ equal to the pressure of the airflow drawn in by the reciprocating internal combustion engine,
   (d) discharging an airflow coming from the centrifugal compressor into the atmosphere $A1$ through a back pressure valve.

17. The method according to claim 16, further comprising the following steps:
   (a) controlling the pressure in the first container and in the second container, by means of using at least a control valve and by means of using a variable-frequency drive of the electric motor driving the vacuum pump,
   (b) controlling the temperature $T1$ in the first container by means of using at least a temperature conditioning system,
   (c) the exhaust gases suctioned by the vacuum pump are previously cooled in at least a heat exchanger and where the particles of said exhaust gases are retained in at least a particle filter.

18. The method according to claim 17, further comprising heating the airflow at the inlet of the radial inward-flow turbine with the airflow coming from the outlet of the centrifugal compressor by means of using at least a second heat exchanger.

19. The method according to claim 16, further comprising
   (a) increasing the pressure of the exhaust gases coming from the second container by means of using at least a centrifugal compressor and before they enter the vacuum pump,
   (b) cooling the temperature of the combustion gases coming from the second container before they enter the centrifugal compressor by means of using a third heat exchanger,
   (c) cooling the exhaust gases at the outlet of the centrifugal compressor before they enter the vacuum pump by means of using at least a heat exchanger,
   (d) controlling the pressure at the outlet of the centrifugal compressor by means of using at least a flow diode or check valve.

20. The method according to claim 16, further comprising at least a second radial inward-flow turbine and at least a second centrifugal compressor operating in series with respect to the radial inward-flow turbine and the centrifugal compressor.

21. The method according to claim 20, wherein
   (a) it additionally comprises controlling the pressure $p1$ in the first container by means of bypassing the airflow fed to the second radial inward-flow turbine through at least a wastegate, as well as by means of using at least a temperature conditioning system,
   (b) the vacuum pump operates in parallel with respect to the second centrifugal compressor,
   (c) and comprises cooling the exhaust gases in at least a heat exchanger before they enter the vacuum pump and/or the second centrifugal compressor.

22. The method according to claim 16, where the air compressed by the centrifugal compressor is sent to the radial inward-flow turbine through a chiller and/or dehumidifier.

23. The method according to claim 22, further comprising expanding the airflow in a radial inward-flow turbine and in a second radial inward-flow turbine after having been previously compressed in the centrifugal compressor and in the second centrifugal compressor, and cooled between the compression steps in the chiller and/or dehumidifier and in the second chiller and/or dehumidifier.

* * * * *